US011251696B2

(12) United States Patent
Gonthier

(10) Patent No.: US 11,251,696 B2
(45) Date of Patent: Feb. 15, 2022

(54) DISCHARGE OF AN AC CAPACITOR

(71) Applicant: STMicroelectronics LTD, Kowloon (HK)

(72) Inventor: Laurent Gonthier, Taipei (TW)

(73) Assignee: STMicroelectronics LTD, Kowloon (HK)

( * ) Notice: Subject to any disclaimer, the term of this patent is extended or adjusted under 35 U.S.C. 154(b) by 0 days.

(21) Appl. No.: 16/885,781

(22) Filed: May 28, 2020

(65) Prior Publication Data
US 2020/0381992 A1 Dec. 3, 2020

(30) Foreign Application Priority Data

May 31, 2019 (FR) ...................................... 1905816

(51) Int. Cl.
| | |
|---|---|
| *H02M 1/32* | (2007.01) |
| *H02M 7/155* | (2006.01) |
| *H02M 1/08* | (2006.01) |
| *H02M 1/00* | (2006.01) |

(52) U.S. Cl.
CPC .......... *H02M 1/322* (2021.05); *H02M 1/0085* (2021.05); *H02M 1/08* (2013.01); *H02M 7/155* (2013.01); *H02M 7/1555* (2013.01)

(58) Field of Classification Search
CPC .. H02M 1/08–096; H02M 1/32; H02M 1/322; H02M 7/02; H02M 7/04; H02M 7/06; H02M 7/066; H02M 7/145; H02M 7/155–1626; H02H 3/24–247; H02H 7/125–1252
See application file for complete search history.

(56) References Cited

U.S. PATENT DOCUMENTS

| | | | |
|---|---|---|---|
| 6,424,125 B1 * | 7/2002 | Graham | .................... H02H 3/14 320/166 |
| 9,787,211 B1 | 10/2017 | Schneider et al. | |
| 10,170,975 B1 | 1/2019 | Feng et al. | |

(Continued)

FOREIGN PATENT DOCUMENTS

| | | |
|---|---|---|
| EP | 2495854 A2 | 9/2012 |
| EP | 2509200 A1 | 10/2012 |

(Continued)

OTHER PUBLICATIONS

STMicroelectronics: "Inruch-current limiter circuits (ICL) with Triacs and Thyristors (SCR) and controlled bridge design tips". Mar. 31, 2016 (Mar. 31, 2016), XP055754586.

(Continued)

*Primary Examiner* — Fred E Finch, III
(74) *Attorney, Agent, or Firm* — Crowe & Dunlevy

(57) ABSTRACT

A circuit includes two thyristors coupled in anti-series. An AC capacitor has first and second electrodes respectively coupled to two different electrodes of the two thyristors. The first and second electrodes are coupled to receive an AC voltage. A control circuit detects discontinuance of application of the AC voltage to the AC capacitor and in response thereto simultaneously applies same gate currents to the two thyristors. A current path through the two thyristors (one passing current in forward mode and the other in reverse mode) discharges a residual voltage stored on the AC capacitor.

31 Claims, 5 Drawing Sheets

(56) References Cited

U.S. PATENT DOCUMENTS

| | | | |
|---|---|---|---|
| 2011/0025278 A1* | 2/2011 | Balakrishnan | H02M 1/32 |
| | | | 320/166 |
| 2011/0101775 A1* | 5/2011 | Busch | H02J 9/005 |
| | | | 307/18 |
| 2012/0207505 A1 | 8/2012 | Kobayashi et al. | |
| 2012/0230075 A1 | 9/2012 | Lee | |
| 2013/0027999 A1* | 1/2013 | Ptacek | H02M 1/36 |
| | | | 363/126 |
| 2013/0076315 A1* | 3/2013 | Liu | H02M 1/32 |
| | | | 320/166 |
| 2013/0188405 A1 | 7/2013 | Jin et al. | |
| 2017/0170746 A1* | 6/2017 | Benabdelaziz | H02M 7/1623 |
| 2017/0187217 A1* | 6/2017 | Gong | G01R 19/155 |
| 2017/0302169 A1 | 10/2017 | Yamada | |
| 2017/0346325 A1* | 11/2017 | Ohtake | H02J 7/0063 |
| 2019/0006959 A1 | 1/2019 | Benabdelaziz et al. | |
| 2019/0222136 A1* | 7/2019 | Gonthier | H02M 7/1623 |

FOREIGN PATENT DOCUMENTS

| | | |
|---|---|---|
| EP | 2592738 A2 | 5/2013 |
| EP | 3096456 A1 | 11/2016 |
| FR | 3037741 A1 | 12/2016 |

OTHER PUBLICATIONS

INPI Search Report and Written Opinion for FR 1905816 dated May 31, 2019 (10 pages).
First Office Action for co-pending EP Appl. No. 20177512.9 dated Jan. 21, 2021 (7 pages).

* cited by examiner

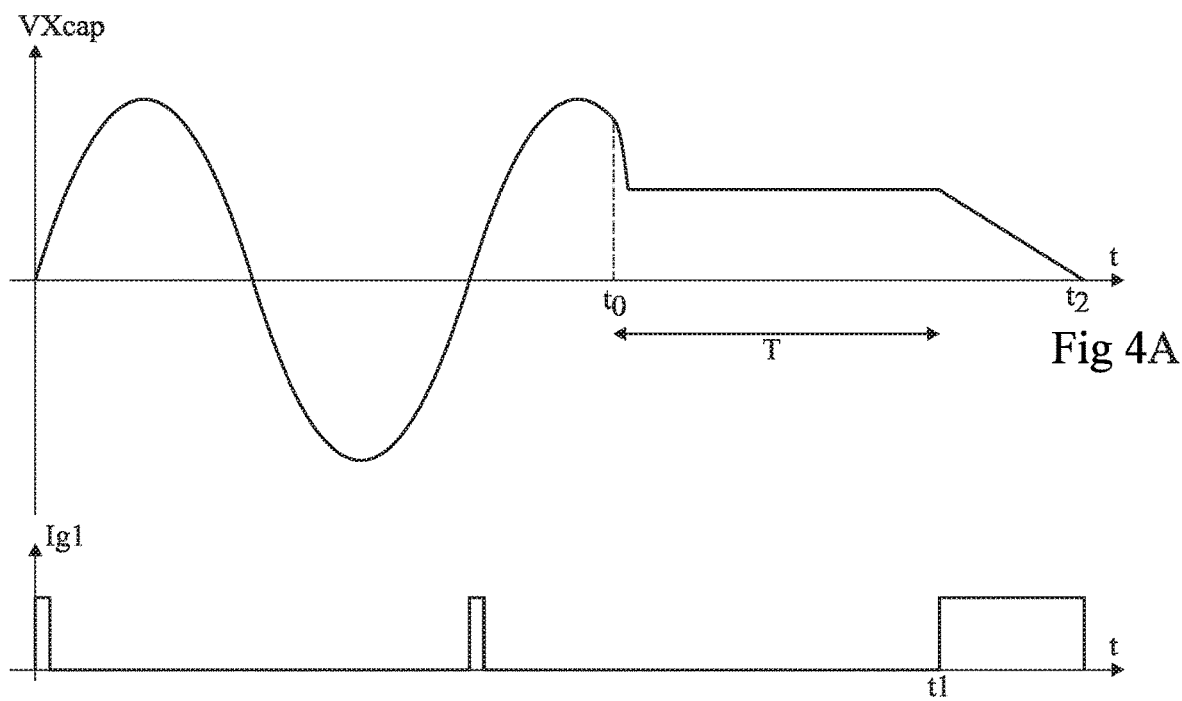
Fig 4A
Fig 4B
Fig 4C
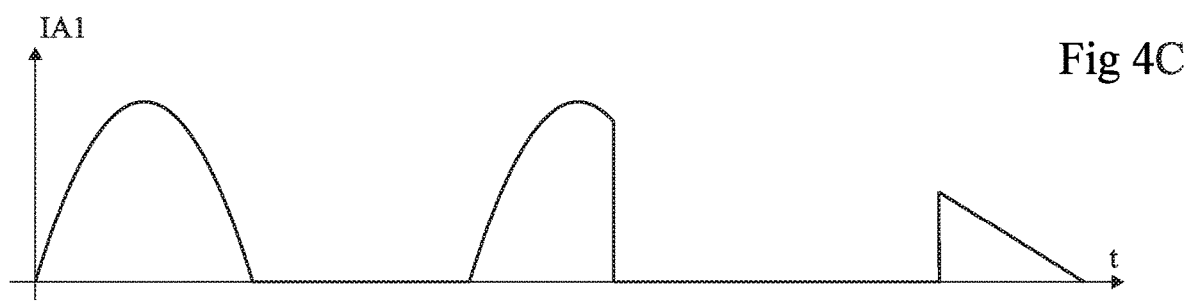
Fig 4D
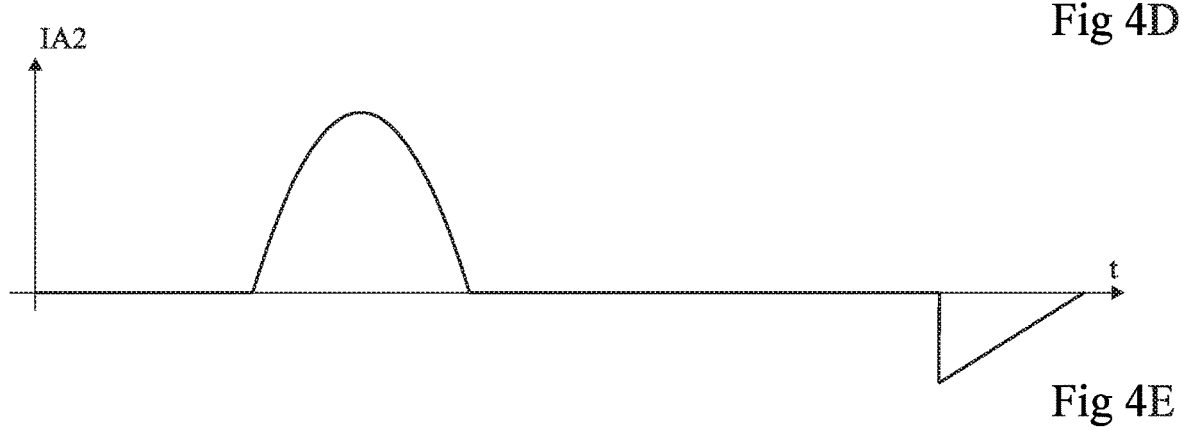
Fig 4E

DISCHARGE OF AN AC CAPACITOR

PRIORITY CLAIM

This application claims the priority benefit of French Application for Patent No. 1905816, filed on May 31, 2019, the content of which is hereby incorporated by reference in its entirety to the maximum extent allowable by law.

TECHNICAL FIELD

The present disclosure generally concerns electronic circuits and more particularly circuits configured to be coupled to an AC voltage source, such as the electric power distribution mains. The present disclosure more particularly applies to circuits comprising an AC capacitor.

BACKGROUND

In many applications, the power received from the electric power distribution network by devices connected thereto is filtered by an AC capacitor upstream of a voltage conversion and/or power factor correction circuit. The capacitor is generally directly connected to the line and neutral conductors (or between two phases) of the AC power supply.

The presence of the capacitor requires discharging it when the device is disconnected from the network. Indeed, the charge that it contains at the time when the device is disconnected should be discharged or dissipated for electric security reasons. This need is all the greater as the power is high.

Although many solutions exist for this problem, they are often complex and/or expensive.

There is a need in the art for a simple and inexpensive AC capacitor discharge circuit.

SUMMARY

An embodiment overcomes all or part of the disadvantages of AC capacitor discharge circuits.

In an embodiment, a circuit comprises two thyristors in anti-series and an AC capacitor having its two electrodes respectively coupled to two different electrodes of the thyristors. The circuit includes a control circuit configured to implement a process for operation wherein same gate currents are simultaneously applied to the two thyristors when the circuit detects that there is no AC voltage across the AC capacitor.

According to an embodiment, one of the thyristors conducts in the reverse direction in response to application of said gate currents.

According to an embodiment, said gate currents are applied to discharge the AC capacitor when said AC voltage stops being applied to the electrodes of the capacitor for a time period longer than a first threshold by at least one half period of the AC voltage.

According to an embodiment, said gate currents stop being applied if the circuit does not detect that an input voltage becomes smaller than a second threshold for a time period longer than a third threshold, said third threshold being greater than the first one.

According to an embodiment, said gate currents are applied for a time period longer than that of a half-period of the AC voltage configured to be applied to the two electrodes of the capacitor.

According to an embodiment, said gate currents are applied for a time period from a few tens of milliseconds to a few hundreds of milliseconds.

According to an embodiment, said gate currents are applied continuously.

According to an embodiment, said gate currents are applied in pulses.

According to an embodiment, said thyristors are controlled by a circuit which operates to detect the absence of a voltage between terminals of application of the AC voltage.

According to an embodiment, the thyristors form part of a bridge for rectifying the AC voltage.

According to an embodiment, in the presence of the AC voltage, the thyristors are controlled with pulses to rectify the AC voltage.

According to an embodiment, the thyristors receive a simultaneous control pulse for each halfwave of the AC voltage.

According to an embodiment, the thyristors each receive a control pulse one halfwave out of two of the AC voltage.

According to an embodiment, an output of the bridge powers a switched-mode power supply, said gate currents being generated under control of a circuit for controlling the switched-mode power supply.

According to an embodiment, the thyristors are cathode-gate thyristors.

According to an embodiment, the thyristors are anode gate thyristors.

BRIEF DESCRIPTION OF THE DRAWINGS

The foregoing and other features and advantages will be discussed in detail in the following non-limiting description of specific embodiments in connection with the accompanying drawings, in which:

FIGS. 4A-4E illustrate the operation of the system of FIG. 2 in response to a disappearance of an AC power supply voltage;

DETAILED DESCRIPTION

Figure 1:
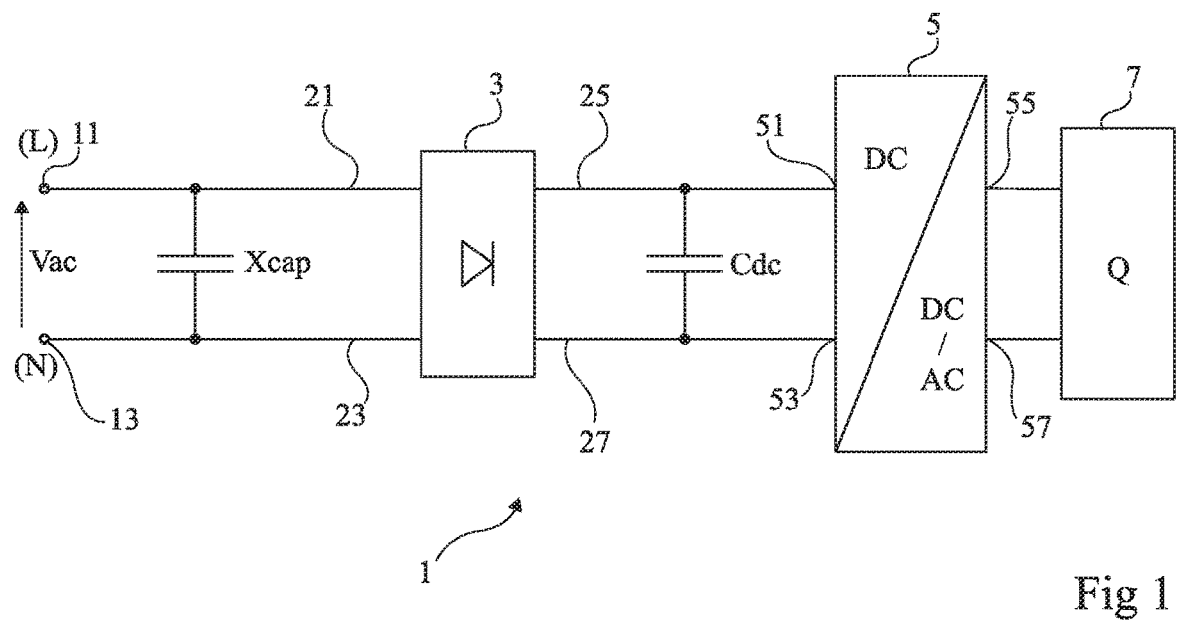
FIG. 1 shows an example of a power conversion system.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the DC/AC or DC/DC power converter powered by the described circuit as well as the control of such a power converter have not been detailed, the described embodiments being compatible with usual converters and usual controls of such converters.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10%, preferably of plus or minus 5%, of the value in question.

FIG. 1 shows an example of a power conversion system 1. Such a conversion system 1 is based on a halfwave or fullwave rectification of an AC power supply voltage Vac, followed by a DC/DC or DC/AC conversion to power a load (Q).

Schematically, AC voltage Vac is applied between two input terminals 11 (L) and 13 (N) coupled to AC input terminals 21 and 23 of a rectifying bridge 3. Voltage Vac is, for example, the AC voltage or mains voltage of a 230V/50 Hz or 60 Hz, or 110V/50 Hz or 60 Hz power distribution network. Typically, terminals 11 and 13 are formed of pins of a plug of connection of system 1 to a socket of an electrical installation.

Rectified output terminals 25 and 27 of the rectifying bridge are coupled to input terminals 51 and 53 of a DC/DC or DC/AC conversion circuit 5. Output terminals 55 and 57 (DC or AC according to the embodiment) of circuit 5 provide a power supply voltage to a load 7 (Q). A DC capacitor Cdc couples, preferably connects, terminals 25 and 27 to smooth the rectified voltage and deliver a rectified voltage at the input of circuit 5.

In the applications targeted by the present disclosure, an AC capacitor Xcap couples, preferably connects, terminals 11 and 13 upstream of any element of conversion system 1 and in particular upstream of bridge 3. The function of capacitor Xcap is to filter AC voltage Vac, particularly to remove possible high-frequency disturbances (at a frequency greater than the frequency of AC voltage Vac).

The presence of an AC input capacitor Xcap requires discharging this capacitor for security reasons when the system is disconnected from the electrical installation in case of a contact being made by a user with terminals 11 and 13 when the system is disconnected. This need is all the greater as the system power is high. Indeed, the power stored in the capacitor risks otherwise being discharged by the body of the user touching the two terminals.

Many solutions to discharge an AC capacitor when the AC input voltage disappears have already been provided.

A first category of solutions uses passive components, with capacitor Xcap then forming part of an AC filter having a resistor of low value connected in parallel with the capacitor and dissipating the power that it contains when the system is disconnected. A disadvantage of such a solution is a permanent power dissipation in the application.

A second category of solutions uses active components to control a discharge of the AC capacitor when power supply voltage Vac disappears. Such solutions generally require additional circuits and components which increase the cost of the system or of the application.

According to the described embodiments, it is provided to take advantage of a specific rectifying bridge structure equipping the power conversion system, that is, a mixed bridge or a controllable bridge.

A rectifying bridge, for example, fullwave, is formed of four branches coupling two by two each input terminal to each output terminal, a rectifying element (typically a diode) being present in each branch.

A controllable bridge is a rectifying bridge where two of the four branches (mixed bridge) or the four branches comprise, instead of a diode, a switch, typically a thyristor or a SCR.

Such a bridge generally equips power conversion systems either as a complement of a non-controllable bridge to short-circuit an inrush current limiting resistor, once the system has started, or to ensure a progressive charging of an output capacitor (soft start). Such a bridge may also be used without the inrush current limiting resistor but while using the controllable elements of the bridge to progressively charge the downstream capacitors on starting of the system.

According to the described embodiments, it is provided to use the bridge thyristors to discharge the AC capacitor when the system is disconnected from the power network.

Advantage is then taken from a specific characteristic of the thyristor, which is that the circuit device has, when it is reverse biased but submitted to a gate current, a significant leakage current.

Figure 2:
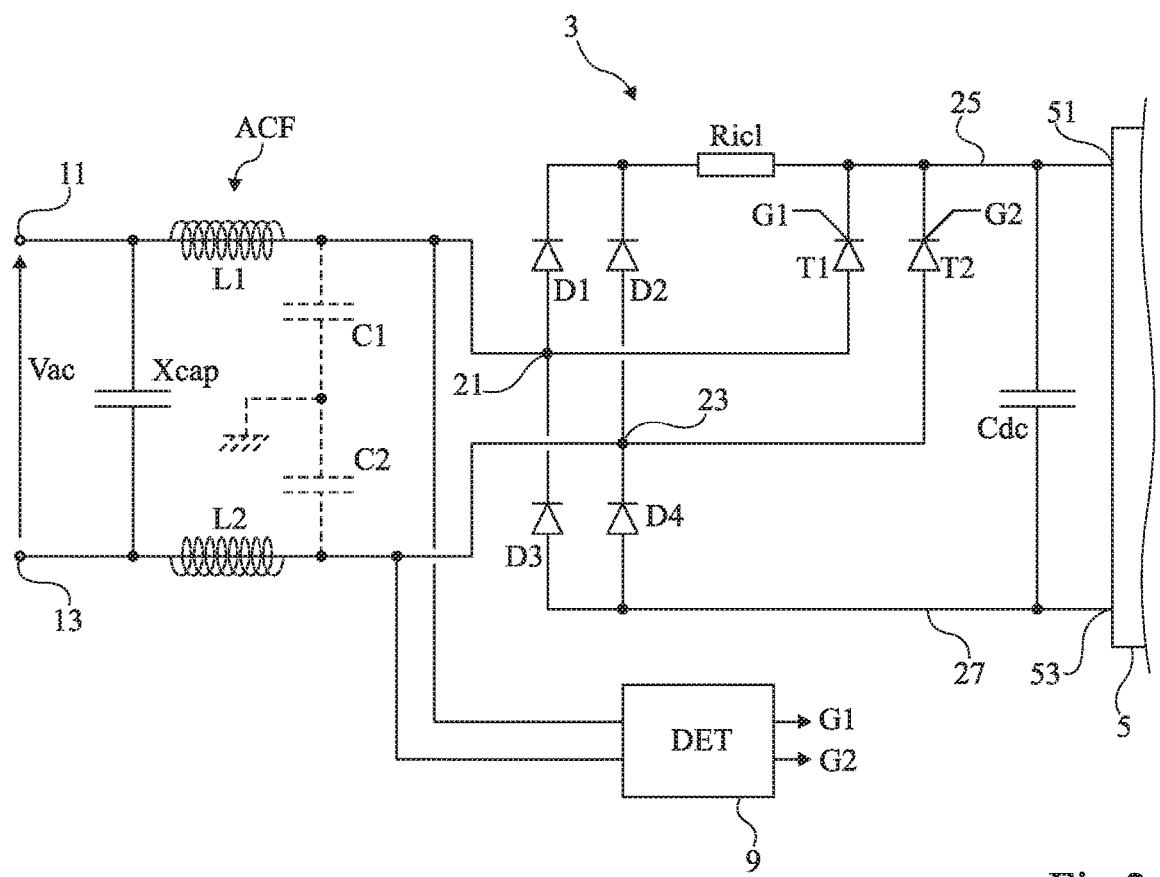
FIG. 2 schematically shows an embodiment of a power conversion system or circuit equipped with an AC capacitor discharge function.

FIG. 2 very schematically shows an embodiment of a power conversion system or circuit equipped with an AC capacitor discharge function.

It comprises: input terminals 11 and 13 of application of an AC power supply voltage Vac; an AC capacitor Xcap coupled, preferably connected, to terminals 11 and 13; a rectifying bridge 3, for example, fullwave, having AC input terminals 21 and 23 respectively coupled to terminals 11 and 13 and having rectified output terminals 25 and 27 respectively coupled, preferably connected, to input terminals 51 and 53 of a DC/DC or DC/AC converter 5; and one or a plurality of DC capacitors Cdc coupled, preferably connected, to terminals 25 and 27.

In the example of FIG. 2, the presence of an AC filter ACF (shown in dotted lines) between terminals 11 and 12 and terminals 21 and 23 is assumed. Such an optional filter generally comprises inductive and capacitive elements and is used to remove electrical noise present on the lines of the power distribution network. For example, an inductance L1 couples, preferably connects, terminals 11 and 21 and an inductance L2 couples, preferably connects, terminals 13 and 23. A capacitor C1 couples, preferably connects, terminal 21 to ground and a capacitor C2 couples, preferably connects, terminals 23 to ground.

Converter 5 is preferably a switched-mode power supply controlled at a frequency much higher (by a ratio in the order of from 1,000 to 10,000) than the frequency of voltage Vac.

According to the described embodiments, rectifying bridge 3 is a fullwave bridge associated with a controllable half-bridge, or a mixed bridge associated with a diode half-bridge, which is the same.

In the example of FIG. 2, bridge 3 comprises: two diodes D1 and D2 coupling, preferably connecting, respectively terminals 21 and 23 to a first terminal of inrush current limiting resistor Ricl having its other terminal coupled, preferably connected, to terminal 25; two diodes D3 and D4 coupling, preferably connecting, respectively terminals 21 and 23 to terminal 27; and two thyristors T1 and T2, here with a cathode gate, coupling, preferably connecting, respectively terminals 21 and 23 to terminal 25.

At the starting of the circuit, that is, when it is powered with voltage Vac, thyristors T1 and T2 are not controlled and the rectifying of voltage Vac transits through resistor Ricl. Once the circuit has started and is in steady state, thyristors T1 and T2 are alternately controlled according to the half-wave of voltage Vac and ensure the function of rectification of the upper half bridge. At each halfwave, a single one of the two thyristors (that which is forward biased) is conductive. The thyristors are controlled with pulses, that is, their gates receive a current pulse for each halfwave of voltage Vac. The term "pulse" in this context means a signal having a duration shorter than the duration of a halfwave of voltage Vac, preferably by a ratio of at least 10. The use of thyristors enables to short-circuit the resistor Ricl when the system is in steady state. When the resistor, as well as diodes D1 and D2, is not being used, thyristors T1 and T2 may enable to carry out a phase angle control to provide a progressive charge of capacitor(s) Cdc.

The operation of the system at the start and in steady state is usual per se. It should be noted that due to the mixed bridge and to the specific described control, the circuit comprises no resistor in parallel with AC capacitor Xcap.

At the powering off of the circuit, for example, when it is disconnected from a source supplying voltage Vac, it is provided to continue controlling bridge 3, but with a specific control, that is, DC gate currents are simultaneously applied to the two thyristors. The application of a continuous control signal means, as opposed to a pulse signal, a state maintained for a time period at least equal to, preferably greater than, a halfwave of voltage Vac. Thus, in response to the simultaneously applied control signals, one of thyristors T1 and T2 conducts while being forward biased while the other one, although it is reverse biased, has a non-negligible leakage current. Since the two thyristors are in anti-series (interconnected by their electrode of same nature, that is, they have a common anode or a common cathode), it can then be considered that AC capacitor Xcap is short-circuited by thyristors T1 and T2.

If the biasing of capacitor Xcap is positive on the side of terminal 11 (powered off under a positive halfwave with the conventions taken in the drawings), a current of discharge of capacitor Xcap flows from its electrode located on the side of terminal 11 to its electrode located on the side of terminal 13: through inductance L1 of filter ACF if present; through thyristor T1 in the on state in the forward direction; through thyristor T2 in the reverse direction; and through inductance L2 of filter ACF if present.

If the biasing of capacitor Xcap is negative on the side of terminal 13 (powering off under a negative halfwave with the conventions taken in the drawings), a current of discharge of capacitor Xcap flows from its electrode located on the side of terminal 13 to its electrode located on the side of terminal 11: through inductance L2 of filter ACF if present; through thyristor T2 in the on state in the forward direction; through thyristor T1 in the reverse direction; and through inductance L1 of filter ACF if present.

Thus, capacitor Xcap discharges, its power being discharged by dissipation into the series resistors of thyristors T1 and T2 and possibly into the intrinsic resistors of inductances L1 and L2. Although the resistances are small, the resistances are sufficient to discharge capacitor Xcap. In practice, a current of a few milliamperes is sufficient to sufficiently rapidly discharge (within from a few milliseconds to a few tens of milliseconds) capacitor Xcap.

The control of thyristors T1 and T2 is ensured, at the disconnection of voltage Vac, by a circuit 9 (DET) which operates to detect the disappearance of voltage Vac and generate gate currents that are jointly applied to gates G1 and G2 of thyristors T1 and T2. Generally, in the example of cathode gate thyristors, a current is injected into their gates. However, what is described is compatible with cathode gate thyristors controllable by extraction of a current from their gates. Circuit 9 is coupled, preferably connected, to terminals 21 and 23 (or to terminals 11 and 13) to detect, for example, zero crossings of voltage Vac. In the absence of such zero crossings, the circuit 9 can detect the disappearance of voltage Vac.

Circuit 9 and the circuits of control of converter 5 (not shown in FIG. 2) are powered with a low DC voltage. Examples for providing the DC voltage will be subsequently presented in relation with FIGS. 6 and 7.

Figure 3A:
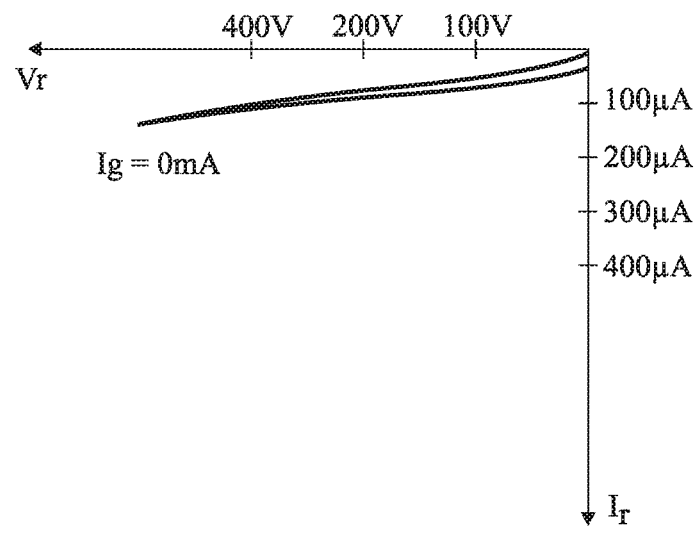
FIGS. 3A-3B illustrate the phenomenon of reverse conduction of a thyristor.
Figure 3B:
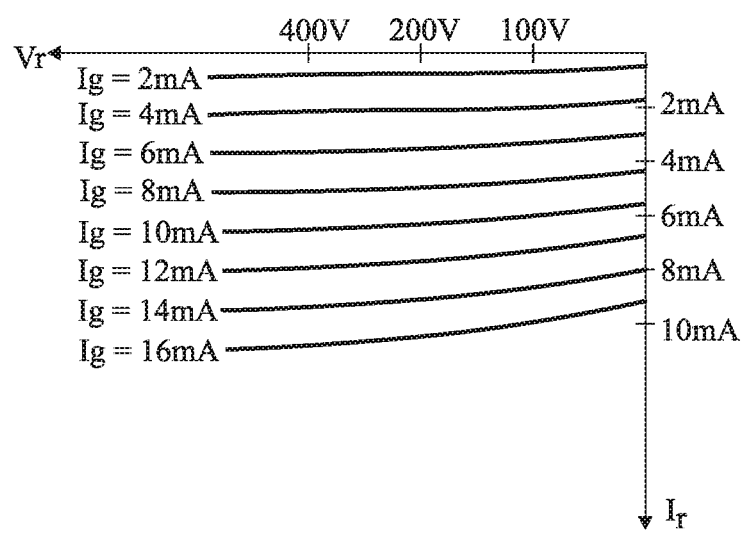

FIGS. 3A-3B illustrate the phenomenon of reverse conduction of a thyristor. FIG. 3A illustrates an example of a shape of a reverse current Ir (or leakage current) according to the reverse voltage Vr (cathode potential minus anode potential) across a thyristor when no gate current Ig is applied thereto. FIG. 3B illustrates examples of shapes of reverse current Ir according to reverse voltage Vr for a plurality of values of gate currents Ig.

As illustrated in FIG. 3A, leakage current Ir is typically in the order of some hundred micro amperes when no gate current is applied (Ig=0 mA). The reverse current slightly increases according to reverse voltage Vr. Such a leakage current level is perfectly negligible in most applications using such power conversion systems since the currents implemented for the application are generally from several tens of milliamperes to several tens of amperes.

However, such a leakage current turns out being insufficient to discharge capacitor Xcap sufficiently rapidly. Several seconds would typically be necessary, which is not acceptable in terms of electric security of the users.

As illustrated in FIG. 3B, reverse current Ir grows by a factor in the order of from 10 to 20 when a gate current Ig in the order of a few milliamperes is applied. For example, reverse current Ir is: in the order of 2 mA for a gate current in the order of 6 mA; in the order of 4 mA for a gate current in the order of 8 mA; in the order of 6 mA for a gate current in the order of 12 mA; and in the order of 10 mA for a gate current in the order of 16 mA.

Reverse current Ir slightly increases with the increase of reverse voltage Vr, but by proportions in the order of from 10 to 20% between 100 and 400 volts, which is the mainly targeted range of power supply voltages. Thus, the discharge of capacitor Xcap may be performed much faster and, additionally, with a sufficient current during the longest part of the discharge range (up to a few tens of volts).

It should be noted that, unlike a control for the starting of a forward-biased thyristor, which may be performed with pulses (a pulse of a few microseconds per halfwave of voltage Vac is sufficient to turn on the thyristor), the gate current should be continuously applied to take advantage of the reverse conduction.

FIGS. 4A-4E illustrates the operation of the system of FIG. 2. FIG. 4A shows an example of the shape of voltage VXcap across capacitor Xcap. FIG. 4B shows an example of the shape of the gate current Ig1 of thyristor T1. FIG. 4C shows an example of the shape of the gate current Ig2 of thyristor T2. FIG. 4D illustrates an example of the shape of current IA1 in thyristor T1. FIG. 4E illustrates an example of the shape of current IA2 in thyristor T2.

By convention, it is assumed that: voltage VXcap is the potential difference between the electrode on the side of terminal 11 and the electrode on the side of terminal 13; and gate current Ig1 or Ig2 is positive when a current is injected into the gate of the concerned thyristor; and current IA1 or IA2 in the thyristor is positive when it enters through the anode of the concerned thyristor.

In steady state, thyristor T1 is turned on for each positive halfwave of AC voltage Vac, that is, when voltage VXcap is positive, and thyristor T2 is turned on for each negative halfwave of voltage Vac, that is, when voltage VXcap is negative. The example of FIGS. 4A-4E assumes a starting of the thyristor at the voltage zero, that is, positive gate current pulses are applied at the beginning of each halfwave for starting the concerned thyristors. In the example of FIGS. 4A-4E, for simplification, neither filter ACF nor possible other sources of phase shift between the voltage and the current are considered. It is also assumed that converter 5 absorbs a current in phase with the mains voltage, which is the case when converter 5 also ensures a function of correction of the power factor of the complete circuit. In this case, currents IA1 and IA2 have positive and negative halfwaves. The thyristor conduction stops when the current flowing therethrough becomes zero, when the voltage thereacross reverses.

The control of thyristors T1 and T2 in steady state is provided by a control circuit, preferably synchronized on voltage Vac. Such a circuit (not shown in FIG. 2) may be a dedicated circuit, a microcontroller, or may be included in circuit 9.

In steady state, voltage VXcap reverses for each halfwave (it follows voltage Vac) and thus becomes zero twice per period of voltage Vac.

It is assumed that at a time to, voltage Vac disappears (dotted lines in FIG. 4A). Such a disappearance causes an abrupt decrease (faster than the decrease of voltage Vac) of voltage VXcap due to the operation of converter 5, which keeps on absorbing a current supplied by capacitor Xcap. Converter 5 then abruptly stops operating, and the discharge of capacitor Xcap accordingly stops, when the voltage thereacross falls below a given threshold.

However, capacitor Xcap remains charged at a level corresponding to a value typically between 100 and 200 volts. In case of a disconnection of voltage Vac while converter 5 is very lightly charged, the voltage may remain equal to the mains voltage at the time of the disconnection (that is, between 0 and 320 volts for a rms voltage of 230 volts).

Circuit 9 monitors voltage Vac to detect its disappearance. For example, circuit 9 detects using a zero-crossing detection circuit that the voltage across capacitor Xcap or between terminals 11 and 13, or between terminals 21 and 23, does not become equal to zero for a time period longer than at least one halfperiod, preferably from one to a few periods, of voltage Vac.

In the example of FIG. 4, at a time t1 which follows the disappearing of voltage Vac for a time period T, that is, after a time period during which voltage VXcap does not take value zero, circuit 9 triggers the generation of a gate current in the two thyristors. Thyristor T1 is, in the example of FIG. 4, forward-biased and is thus turned on. Thyristor T2 is reverse-biased but conducts a negative leakage current IA2. The amplitude of the gate current conditions the amplitude of the leakage current, and thus the speed and duration of the discharge of capacitor Xcap. When the capacitor is discharged (time t2), the disappearance of the current in thyristor T1 causes it to turn off. Circuit 9 detects that voltage VXcap across capacitor Xcap becomes zero and stops the generation of the gate signals of the thyristors.

Figure 5:
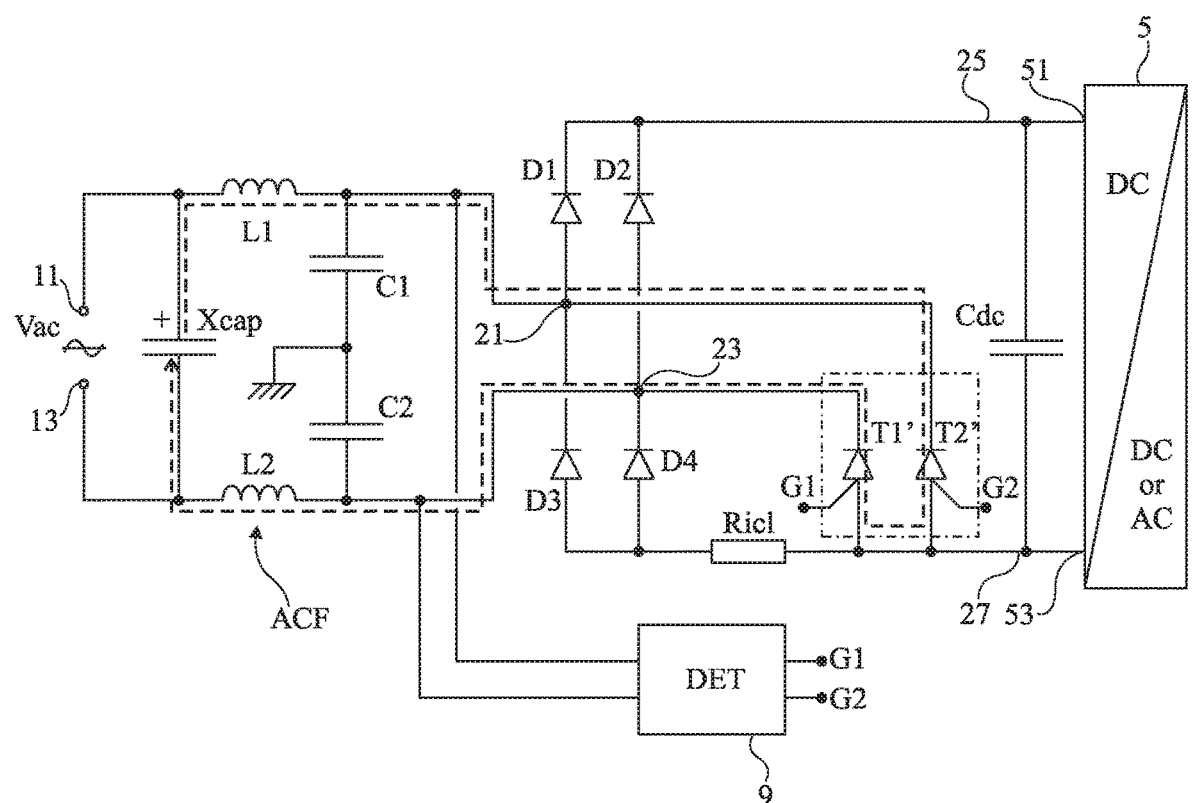
FIG. 5 schematically shows another embodiment of a power conversion system or circuit equipped with an AC capacitor discharge function.

FIG. 5 very schematically shows another embodiment of a power conversion system or circuit equipped with an AC capacitor discharge function.

This embodiment uses the principle of a rectifying diode bridge associated with a controllable half-bridge. The elements common to the embodiment of FIG. 2 are not described again.

A difference with the embodiment of FIG. 2 is that inrush current limiting resistor Ricl is interposed between the common anodes of diodes D3 and D4 and terminal 27. Another difference is that the controllable half-bridge is a lower half-bridge formed of two anode-gate thyristors T1' and T2'. The common anodes of thyristors T1' and T2' are coupled, preferably connected, to terminal 27. The cathode of thyristor T1' is coupled, preferably connected, to terminal 23. The cathode of thyristor T2' is coupled, preferably connected, to terminal 21. A compared with cathode gate thyristors, anode gate thyristors are generally turned on by extraction of a current from their gate G1 or G2. Thus, circuit 9 of detection of the disappearance of voltage Vac is capable of pulling a current on gates G1 and G2. As a variation, anode gate thyristors controllable by injection of current into their gates are used.

The operation of the circuit of FIG. 5 can be deduced from the operation described in relation with the previous drawings.

According to another embodiment, an inrush current limiting resistor is provided in the upper portion and in the lower portion of the circuit, which amounts to combining the embodiments of FIGS. 2 and 5 and to providing a complete controllable bridge of four thyristors in addition to a complete bridge of four diodes.

According to other embodiments, the thyristor control is, when the thyristors are powered on, controlled for a start with no current peak. This requires an adapted control of the thyristors at the start (by phase angle with a progressively decreased delay), but this avoids resistor Ricl.

Figure 6:
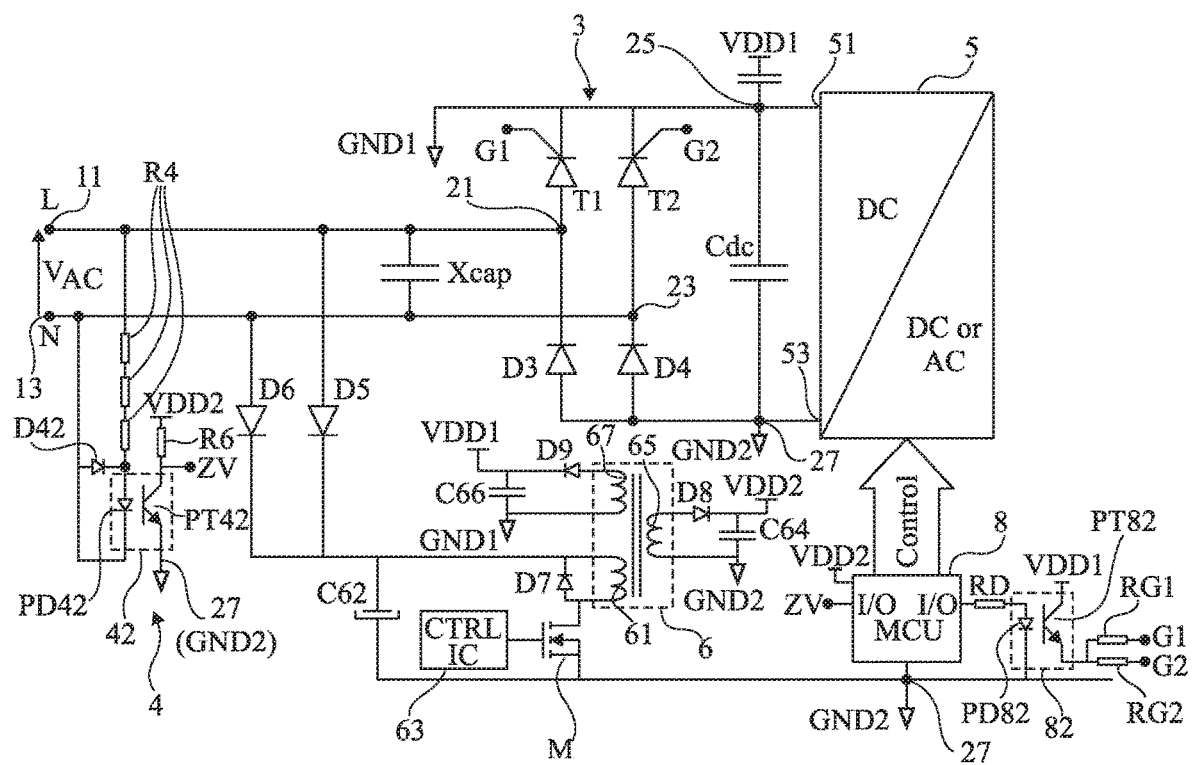
FIG. 6 schematically shows still another embodiment of a power conversion system or circuit equipped with an AC capacitor discharge function.

FIG. 6 very schematically shows still another embodiment of a power conversion system or circuit equipped with an AC capacitor discharge function.

According to this embodiment, rectifying bridge 3 is only formed of a mixed bridge, comprising an upper half bridge with cathode gate thyristors T1 and T2 and a lower half-bridge with diodes D3 and D4. The absence of a system start inrush current limiting resistor is compensated by a specific control of thyristors T1 and T2 to ensure a progressive charge of capacitor Cdc. Advantage is then taken of the presence of a microcontroller 8 (MCU) used to control (Control) switched-mode converter 5 DC/DC or AC) to use the microcontroller to generate the signals of control of gates G1 and G2.

The embodiment of FIG. 6 illustrates another variation concerning the references of the voltages and the generation of low DC voltages (low voltages means voltages smaller than 20 volts, preferably voltages of a few volts) adapted to the control signals. In particular, the injection of a current into the cathode gates of thyristors T1 and T2 requires for the thyristor cathodes to be at a potential (GND1) smaller than the potential (VDD1) of their gates G1 and G2. Further, microcontroller 8 is powered with a low voltage VDD2, referenced with respect to the potential (GND2) of terminal 27. The generation of gate control signals G1 and G2 thus requires a voltage reference change. For this purpose, an output I/O of microcontroller 8, delivering a digital state signal (taking one of potential VDD2 and 0, to within the voltage drops in the output transistors in the on state) is applied to (the anode d') a photodiode PD82 of an optocoupler 82, possibly via a resistor RD. A phototransistor PT82, for example, bipolar, of optocoupler 82 has its collector coupled, preferably connected, to a terminal of supply of potential VDD1. The emitter of phototransistor PT82 is coupled, possibly via resistors RG1 and RG2, to the gates G1 and G2 of thyristors T1 and T2.

In the example of FIG. 6, voltages VDD1 and VDD2 are obtained by a transformer 6 having a first winding or primary 61 having a first terminal coupled, preferably connected, to the cathode of two rectifying diodes D5 and D6 having their anodes respectively coupled, preferably connected, to terminals 11 and 13. The other end of first winding 61 is coupled, on the one hand, to its first end by a diode D7 (anode of diode D7 on the side of the second end) and, on the other hand, to terminal 27 (potential GND2) by a MOS transistor M. Transistor M is controlled by a signal supplied by a system turn-on/turn-off block 63. A capacitor C62 may couple the cathode of diode D7 to terminal 27.

A (first) secondary winding 65 of transformer 6 supplies voltage VDD2 referenced to potential GND2. A first end of winding 65 is coupled, via a diode D8 (anode on the side of the first end of winding 65), to a first terminal of a capacitor C64 supplying potential VDD2 and having its other terminal coupled, preferably connected, to the second end of winding 65 and to terminal 27 (GND2).

A (second) secondary winding 67 of transformer 6 delivers voltage VDD1 referenced to potential GND1. A first end of winding 67 is coupled, via a diode D9 (anode on the side of the first end of winding 67), to a first terminal of a capacitor C66 supplying potential VDD1 and having its other terminal coupled, preferably connected, to the second end of winding 67 and to terminal 25 (GND1).

Microcontroller 8 receives, on a digital input/output terminal I/O, information ZV indicative of the presence or not of voltage Vac. The binary information ZV indicative of a zero voltage at the system input (and thus of an absence of voltage Vac) enables microcontroller 8 to both trigger thyristors T1 and T2 in pulsed fashion at the zero crossing of voltage Vac when present and to control the discharge of capacitor Xcap by forcing the forward conduction of one of the thyristors and the reverse conduction of the other one when signal ZV no longer crosses the threshold representative of the zero level of voltage Vac for a time period equivalent to at least one half period, preferably to a few halfwaves, of voltage Vac. In the example of FIG. 6, a simultaneous control of thyristors T1 and T2, including in pulsed mode, is provided, which is not disturbing since the pulses are sufficiently short to avoid generating a prolonged reverse conduction of the reverse-biased thyristor.

Signal ZV is, for example, obtained by means of a circuit 4, based on an optocoupler 42. The anode of an emitting photodiode PD42 of optocoupler 42 is coupled, by one or a plurality of resistors R4, to one of terminals 11 and 13, for example, terminal 11. The cathode of diode PD42 is coupled, preferably connected, to the other terminal among terminals 11 and 13 as well as to its own anode by a diode D42. Resistors R4 decrease the voltage driving photodiode PD42. A phototransistor PT42 of optocoupler 42 is coupled, preferably connected, by its emitter to terminal 27 (ground GND2) and by its collector to a resistor R6 having its other terminal coupled, preferably connected, to the terminal at potential VDD2. Signal ZV is sampled from the junction point of resistor R6 and of phototransistor PT42. As long as the voltage between terminals 11 and 13 is not zero, photodiode PD42 excites phototransistor PT42, which pulls the state of signal ZV to a low state, generally smaller than 2 volts. When voltage Vac is zero (or at each zero crossing), transistor PT42 turns off and the level of signal ZV is pulled to the high state (VDD2) via resistor R6 (pull-up resistor). When level ZV exhibits no further transitions between the high and low states during the selected time period T (FIG. 4A), microcontroller 8 causes the continuous generation of the gate currents.

Figure 7:
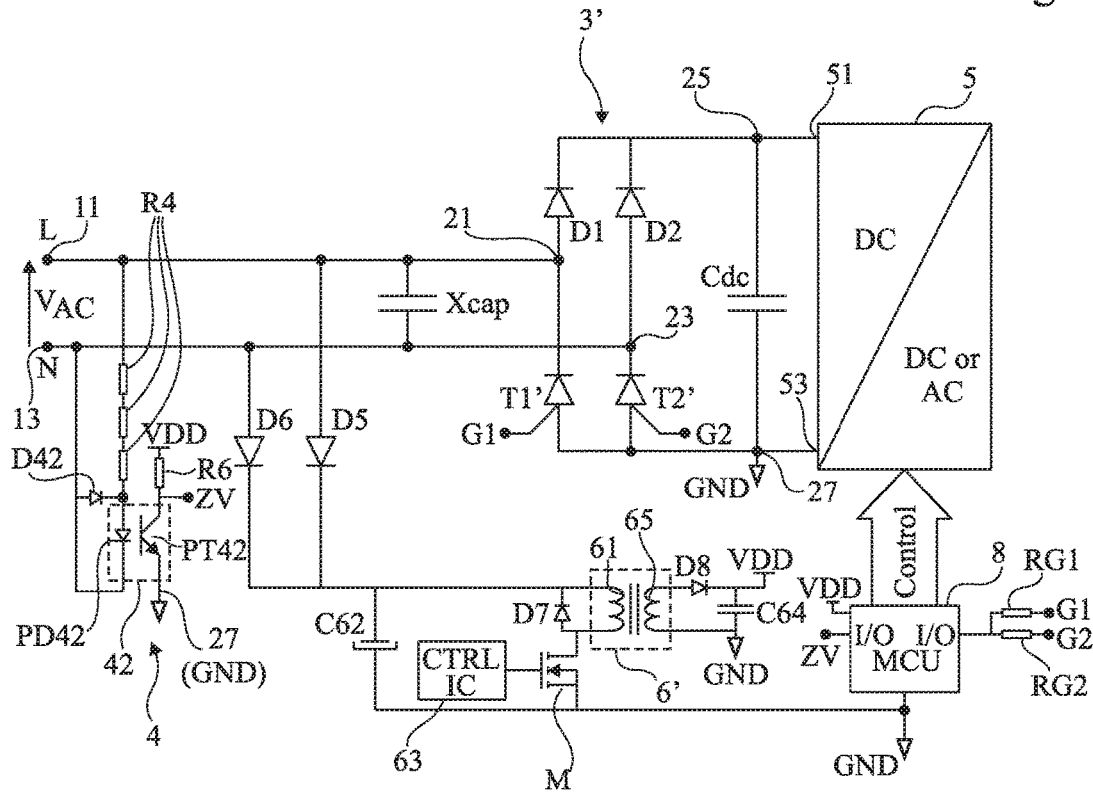
FIG. 7 schematically shows still another embodiment of a power system or circuit equipped with an AC capacitor discharge function.

FIG. 7 very schematically shows still another embodiment of a power conversion system or circuit equipped with an AC capacitor discharge function.

As compared with the embodiment of FIG. 6, thyristors T1' and T2' are anode-gate thyristors in the lower portion of bridge 3', replacing diodes D3 and D4. Thyristors T1 and T2 are replaced with diodes D1 and D2 in the upper portion of bridge 3'. This decreases the number of DC low voltages to be generated to a single voltage VDD since the gate signals G1 and G2 may be referenced to the same reference potential GND as microcontroller 8. Thus, transformer 6' may be simplified to the two windings 61 and 65, winding 65 supplying low voltage VDD powering microcontroller 8 and optocoupler 4. Further, optocoupler 82 (FIG. 6) is not necessary and gate control signal supply output I/O may be directly coupled, preferably connected, to resistor RG1 and RG2. The rest of the circuit of FIG. 7 is similar to that of FIG. 6.

The embodiments of FIGS. 6 and 7 combine the advantages of a discharge of the AC capacitor via the thyristors with the use of a mixed bridge to avoid inrush current limiting resistor Ricl. Further, they enable to use the same microcontroller as that used by switched-mode converter 5 and for the thyristor control during the soft start phase.

An advantage of the described embodiments is that their implementation only requires the generation of a specific control of the thyristors of a mixed bridge.

An advantage of the described embodiments is that the discharge of AC capacitor Xcap is particularly simple and uses circuits of low complexity.

Various embodiments and variations have been described. Those skilled in the art will understand that certain features of these various embodiments and variations may be combined, and other variations will occur to those skilled in the art. In particular, the solution discussed to discharge capacitor Xcap upon powering off by reverse conduction in a thyristor is compatible with any usual system, provided for the rectifying bridge to comprise two upper thyristors and/or two lower thyristors, which are thus in anti-series with their common electrode (common anode or common cathode) coupled to a rectified output terminal of the bridge.

Further, although reference has been made to a simultaneous continuous control of thyristors T1 and T2 to ensure the discharge of capacitor Xcap, a control by simultaneous pulses may be provided, provided for the frequency of the pulses to be much higher, by a ratio of at least 10, than the frequency of AC voltage Vac and/or for the duration of the pulses to be sufficient to guarantee a reverse conduction of the reverse-biased thyristor for a time period sufficient to discharge capacitor Xcap.

Further, it may be provided that, if the input voltage (between terminals 11 and 13) assumed to be an AC voltage does not become lower than a (second) threshold for a time period greater than a (third) threshold, for example, from a few hundreds of milliseconds to a few seconds, the simultaneous control of the thyristors is stopped. Such a variation enables to differentiate the absence of an AC voltage from the presence of a DC input voltage and to disconnect the circuit in the presence of a failure of the mains or of a connection to a DC power source. This amounts to providing a simultaneous control of thyristors T1 and T2 during a time window in the range from a first threshold, for example, of a few tens or hundreds of milliseconds, to a third threshold, for example, of a few hundreds of millisecond or a few seconds, greater than the first threshold. The second threshold is a voltage threshold and corresponds, for example, to a few volts.

Finally, the practical implementation of the described embodiments and variations is within the abilities of those skilled in the art based on the functional indications given hereabove. In particular, the selection of the time period for which voltage Vac has disappeared before the discharge of capacitor Xcap may vary, provided that it is compatible with the maximum time period required to discharge capacitor Xcap, which is generally set by standards. A time period from a few tens of milliseconds to a few hundreds of milliseconds is a preferred choice, more preferably in the order of from 40 to 300 ms.

The invention claimed is:

1. A circuit, comprising:
a rectification circuit for rectifying an AC voltage;
two thyristors coupled to the rectification circuit in anti-series;
an AC capacitor having first and second electrodes respectively coupled to two different electrodes of said two thyristors and respectively coupled to two different electrodes of the rectification circuit and further configured to receive the AC voltage; and
a control circuit configured to detect discontinuance of receipt of the AC voltage at the first and second electrodes of the AC capacitor and in response thereto simultaneously apply gate currents to the two thyristors which provide a circuit path for discharge of a voltage on the AC capacitor, and wherein said two thyristors are further controlled, in the presence of the AC voltage, with pulses to rectify the AC voltage.

2. The circuit of claim 1, wherein a first thyristor of said two thyristors conducts in a reverse direction in response to the simultaneous application of said gate currents.

3. The circuit of claim 1, wherein the control circuit detects discontinuance of receipt of the AC voltage if discontinued receipt of said AC voltage lasts for a time period longer than a first threshold, where said first threshold is at least one half-period of the AC voltage.

4. The circuit of claim 3, wherein the control circuit further stops application of said gate currents if an input voltage does not become smaller than a second threshold for a time period longer than a third threshold, where said third threshold is longer than the first threshold.

5. The circuit of claim 1, wherein said control circuit applies said gate currents for a time period longer than a half period of the AC voltage.

6. The circuit of claim 5, wherein said time period is in a range of a few tens of milliseconds to a few hundreds of milliseconds.

7. The circuit of claim 5, wherein said gate currents are applied continuously.

8. The circuit of claim 5, wherein said gate currents are applied in pulses.

9. The circuit of claim 1, wherein the rectification circuit comprises first and second rectifying diodes having terminals connected to said two different electrodes of the two thyristors.

10. The circuit of claim 9, wherein the first and second rectifying diodes form part of a bridge for rectifying the AC voltage.

11. The circuit of claim 9, wherein the first and second rectifying diodes connected to the two thyristors form a bridge for rectifying the AC voltage.

12. The circuit of claim 1, wherein said pulses to rectify comprise a pulse applied to the thyristor corresponding to a halfwave of the AC voltage.

13. The circuit of claim 1, wherein each thyristor receives said pulse in only one halfwave out of two halfwaves of the AC voltage.

14. The circuit of claim 1, wherein an output of the rectification circuit powers a switched-mode power supply, and wherein said control circuit further operates to control the switched-mode power supply.

15. The circuit of claim 1, wherein the two thyristors are cathode-gate thyristors.

16. The circuit of claim 1, wherein the two thyristors are anode-gate thyristors.

17. A circuit, comprising:
an inrush current limiting resistor;
a rectification bridge circuit including a first diode coupled between a first input node and a first terminal of the inrush current limiting resistor, a second diode coupled between a second input node and the first terminal of the inrush current limiting resistor, a third diode coupled between the first input node and an output node, and a fourth diode coupled between the second input node and the output node, wherein the first and second input nodes are coupled to receive an AC voltage;
a first thyristor coupled between the first input node and a second terminal of the inrush current limiting resistor;
a second thyristor coupled between the second input node and the second terminal of the inrush current limiting resistor;
an AC capacitor having first and second electrodes respectively coupled to the first and second input nodes; and
a control circuit configured to detect discontinuance of receipt of the AC voltage at the first and second electrodes of the AC capacitor and in response thereto simultaneously apply gate currents to the first and second thyristors which provide a circuit path for discharge of a voltage on the AC capacitor.

18. The circuit of claim 17, wherein one of the first and second thyristors conducts in a reverse direction in response to the simultaneous application of said gate currents.

19. The circuit of claim 17, wherein said gate currents are applied continuously.

20. The circuit of claim 17, wherein said gate currents are applied in pulses.

21. The circuit of claim 17, wherein said first and second thyristors are further controlled, in the presence of the AC voltage, with pulses to rectify the AC voltage.

22. The circuit of claim 17, wherein the first and second thyristors are cathode-gate thyristors.

23. The circuit of claim 17, wherein the first and second thyristors are anode-gate thyristors.

24. The circuit of claim 17, wherein the control circuit detects discontinuance of receipt of the AC voltage if discontinued receipt of said AC voltage lasts for a time period longer than a first threshold, where said first threshold is at least one half-period of the AC voltage.

25. A circuit, comprising:
a rectification bridge circuit including a first thyristor coupled between a first input node and a first output node, a second thyristor coupled between a second input node and the first output node, a first diode coupled between the first input node and a second output node, and a second diode coupled between the second input node and the second output node, wherein the first and second input nodes are coupled to receive an AC voltage;

an AC capacitor having first and second electrodes respectively coupled to the first and second input nodes; and a control circuit configured to detect discontinuance of receipt of the AC voltage at the first and second electrodes of the AC capacitor and in response thereto simultaneously apply gate currents to the first and second thyristors which provide a circuit path for discharge of a voltage on the AC capacitor, and wherein said first and second thyristors are further controlled, in the presence of the AC voltage, with pulses to rectify the AC voltage.

26. The circuit of claim 25, wherein one of the first and second thyristors conducts in a reverse direction in response to the simultaneous application of said gate currents.

27. The circuit of claim 25, wherein said gate currents are applied continuously.

28. The circuit of claim 25, wherein said gate currents are applied in pulses.

29. The circuit of claim 25, wherein the first and second thyristors are cathode-gate thyristors.

30. The circuit of claim 25, wherein the first and second thyristors are anode-gate thyristors.

31. The circuit of claim 25, wherein the control circuit detects discontinuance of receipt of the AC voltage if discontinued receipt of said AC voltage lasts for a time period longer than a first threshold, where said first threshold is at least one half-period of the AC voltage.

* * * * *